UNITED STATES PATENT OFFICE.

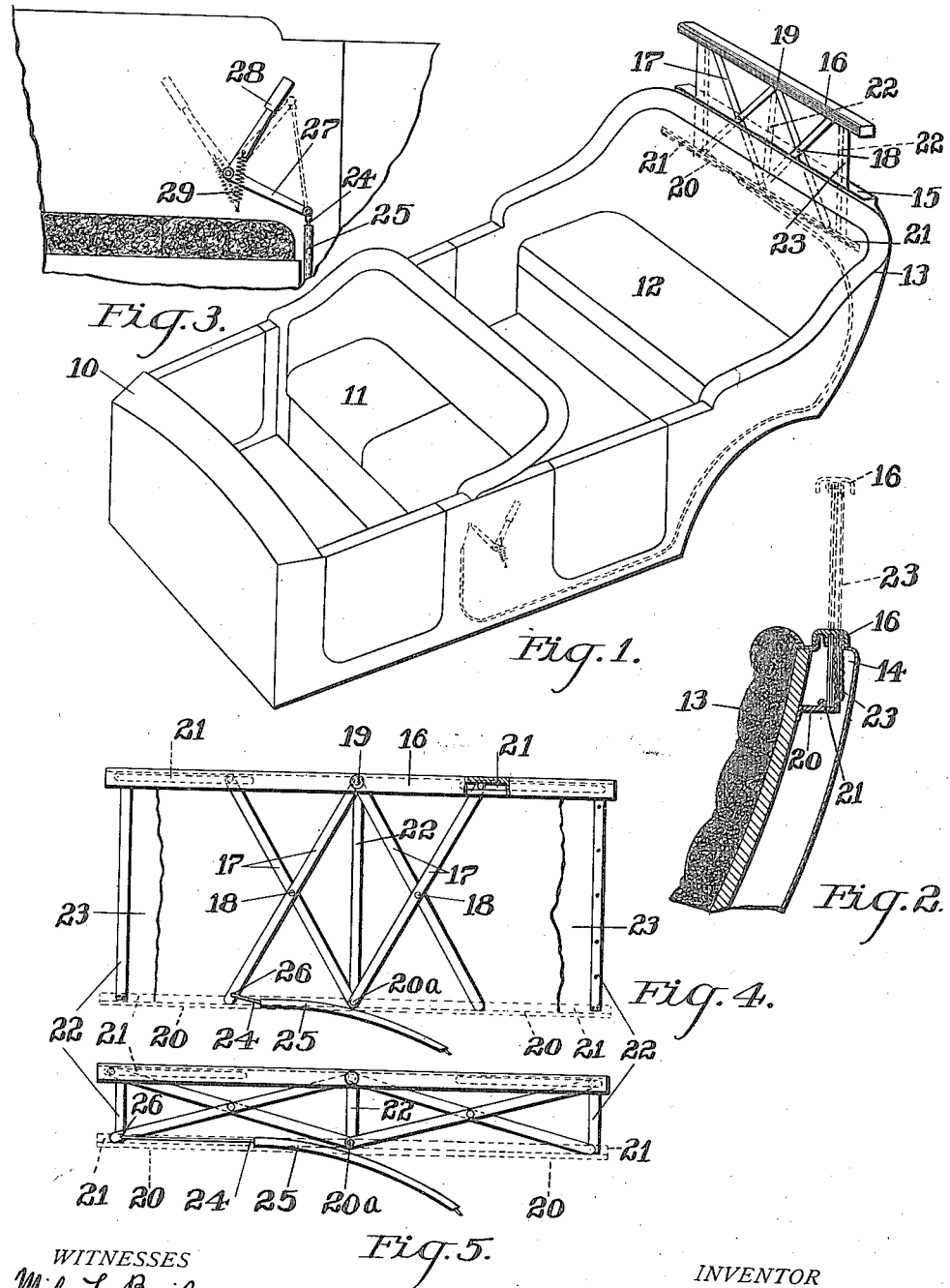

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,157,879.  Specification of Letters Patent.  Patented Oct. 26, 1915.

Application filed December 26, 1912. Serial No. 738,686.

*To all whom it may concern:*

Be it known that I, ALLEN LOOMIS, a citizen of the United States, and resident of Detroit, Wayne county, State of Michigan, have invented certain new and useful Improvements in Motor-Vehicles, of which the following is a specification.

This invention relates to motor vehicles, and particularly to a device to be attached to the body for shutting off the glare of light from another vehicle approaching from the rear.

It is found in driving motor vehicles having windshields, that the lights of another vehicle approaching from the rear, reflect from the windshield into the operator's eyes and make driving unsafe.

The present invention has for its principal object the provision of a curtain or other suitable means which may be controlled by the operator or driver and may be raised above the back of the rear seat of the vehicle, so that the light from such approaching vehicle may be intercepted and the glare from the windshield thereby eliminated.

One embodiment of the invention is illustrated in the accompanying drawings, which form a part of this specification, and this embodiment will be described in detail. However, it will be understood that various modifications may be made without departing from the spirit or scope of the invention.

Referring to the drawings, Figure 1 is a perspective view of the body of a motor vehicle showing one embodiment of the invention; Fig. 2 is a section through the back of the rear seat, showing the curtain and the pocket into which it drops; Fig. 3 is a fragmentary view of the inside of the front compartment of the body, showing the hand lever for operating the curtain; Fig. 4 is a detail view of the curtain support and operating mechanism in its extended position; and Fig. 5 is a view of the curtain support with the mechanism in its folded position.

Referring to the drawings, the body 10 of a motor vehicle is shown in Fig. 1 as comprising a front compartment having a front seat 11 and a rear compartment having a rear seat 12. The invention may be applied to either of these seats, but it is shown as combined with the back 13 of the rear seat. The back is shown in section in Fig. 2, and the upper part is formed with an elongated pocket 14 extending the length of the back, the upper opening of the pocket being shown at 15 in Fig. 1.

Arranged to cover the opening 15 is a bar 16, preferably of inverted U shape in cross section, and forming a support for the curtain, hereinafter described. This bar normally covers the opening 15, and is raised therefrom by a link mechanism, comprising two pairs of cross links 17, each pair of which is pivoted together, as at 18. The links are also pivoted to the support 16 at 19, and to the bottom 20 of the pocket, at 20ª, and the free ends of the links are adapted to slide in ways 21 in the bottom 20 of the pocket and in the bar 16, respectively. This latter construction is particularly well shown in Figs. 4 and 5, in which the ways 21 in the bottom of the pocket are shown in dotted lines. A curtain 23 has its upper edge attached to the support 16, and its lower edge attached to the bottom of the pocket 14, so that it is raised and lowered by the support 16 as the latter is operated. Inserted in, or fastened to, the curtain 23 are strips 22 of elastic, which are suitably secured to the bottom of the pocket 14 and to the support 16 for retracting the support and confining the curtain when in folded position in the pocket 14.

The link mechanism is moved from its folded position, as shown in Fig. 5, to its upright or operative position, as shown in Fig. 4, by means which are preferably operated by the driver or operator in the front seat 11. This means is shown as consisting of what is known in the trade as a "Bowden wire", which comprises a non-compressible wire 24, operating in a non-compressible tube 25, which wire and tube lead from the back of the rear seat to a convenient point at one side of the front seat 11. One end of the wire 24 is connected to the end of one of the links 17, as at 26, and the other end is connected to a lever 27, having a handle 28 for moving it from the position shown in full lines in Fig. 3 to the position shown in dotted lines. A spring 29 holds the lever 27 in either of its two positions.

From the above, it will be understood that the support 16, and consequently the curtain 23 attached thereto, may be raised by moving the handle 28 from the position in which it is shown in full lines in Fig. 3 to the position shown in dotted lines. Thus an effectual screen is presented between the lights of a vehicle approaching from the rear and the windshield of the driver's vehicle, and the dazzling effects of the lights are removed.

Having thus described my invention, what I claim and desire to secure by Letters Patent, is:—

1. In a motor vehicle, the combination of the body having front and rear seats, the rear seat back having an upwardly opening pocket along the top thereof, a curtain support or bar adapted to cover the opening in said pocket, a curtain connected to said bar and to said seat back inside the pocket, a link mechanism adapted to raise and lower the bar to thereby raise and lower the curtain, and means for operating said mechanism from the front seat.

2. In a motor vehicle, the combination of the body, one of the seat backs of said body having a pocket with an opening, a curtain support or bar adapted to cover the opening in said pocket, a curtain connected to said bar and to said seat back inside the pocket, mechanism for raising and lowering the bar to thereby raise and lower the curtain, and means for manually operating the mechanism.

3. In a motor vehicle, the combination with the seat back, of a curtain connected thereto, a curtain support connected to said curtain and adapted to cover or conceal the curtain when in lowered position, and mechanism for supporting said curtain support on the seat back and raising and lowering it relatively thereto.

4. In a motor vehicle, the combination with the seat back having an elongated upwardly opening pocket therein, of a curtain support or bar adapted to cover said opening, a curtain connected to said bar and to said seat back, mechanism for projecting the bar vertically upward from its position over said opening to thereby raise the curtain, means for retracting the bar, and means for manually operating the mechanism.

In testimony whereof I affix my signature in the presence of two witnesses.

ALLEN LOOMIS.

Witnesses:
 JOHN D. WILSON,
 A. H. KNIGHT.